F. W. PARKINSON AND C. M. KIMBALL.
AUTOMATICALLY CONTROLLED ELECTRIC SYSTEM.
APPLICATION FILED NOV. 15, 1916.
1,330,135. Patented Feb. 10, 1920.
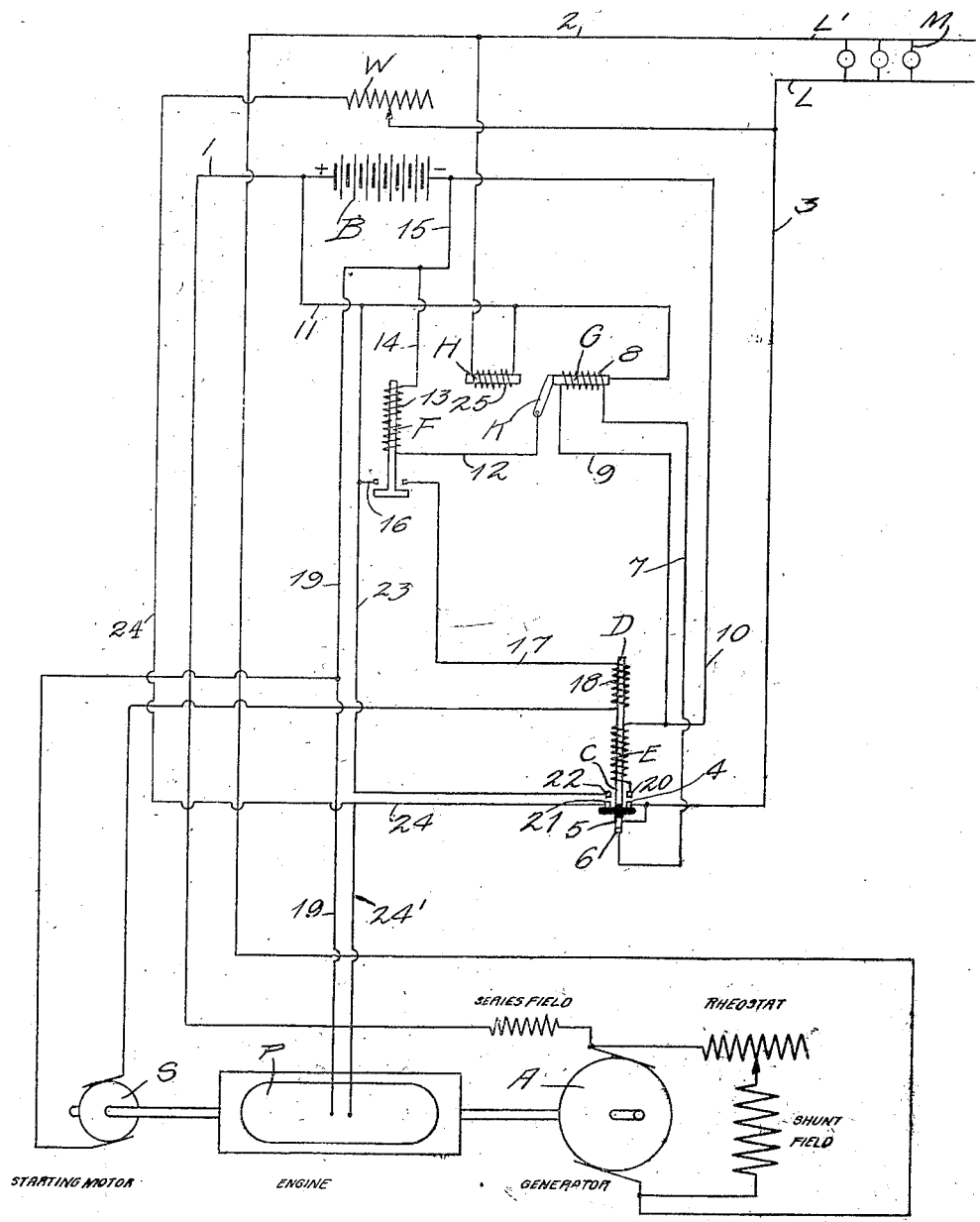

UNITED STATES PATENT OFFICE.

FLOYD W. PARKINSON, OF PEORIA, AND CLARENCE M. KIMBALL, OF DECATUR, ILLINOIS.

AUTOMATICALLY-CONTROLLED ELECTRIC SYSTEM.

1,330,135.   Specification of Letters Patent.   Patented Feb. 10, 1920.

Application filed November 15, 1916. Serial No. 131,578.

*To all whom it may concern:*

Be it known that we, FLOYD W. PARKINSON and CLARENCE M. KIMBALL, citizens of the United States, and residents of Peoria, in the county of Peoria and State of Illinois, and Decatur, in the county of Macon and State of Illinois, respectively, have invented certain new and useful Improvements in Automatically-Controlled Electric Systems, of which the following is a specification.

Our invention relates to improvements in automatically controlled electric systems for lighting or power purposes, and it consists in the combinations, constructions and arrangements herein described and claimed.

An object of our invention is to provide a system which may be used in isolated places, such as suburban or country homes, in which a generator is driven by an internal combustion engine for producing the current, and in which the mere turning on or turning off of lights or other electric device making use of the current in the mains, will start the system in operation, the turning off of the lights effecting the stopping of the engine and generator, and the restoration of the system to a normal condition of rest.

Our invention is illustrated in the accompanying drawing, which is a diagrammatic view showing the general arrangement of the system.

In carrying out our invention we provide a generator A which is a 125 volt flat compounded generator of sufficient K. W. size to meet the requirements of any particular installation. A battery B is provided, this battery being preferably a 12 volt battery having a charging rate corresponding to the full load ampere rating of the generator used. At C we have shown a relay which is operated initially by a coil D and also has a holding coil E. At F is another relay, and at G and H are relays; both are adapted to act on an armature K. The mains are shown at L and L', and the lamps at M.

The operation of the system will be best understood by taking up the action of the various parts of the apparatus in the order in which they occur. Let us assume that the apparatus is in the position shown in the drawing, with the engine P idle. Consider now the action when one or more of the lamps M is turned on; current will flow from the battery B through the wire 1, generator A, wire 2, lamp M, wire 3, contact 4 of relay C, contact 5 of the same relay, contact 6, wire 7, coil 8 of the relay G, wire 9 and wire 10 to battery B. The energization of the coil 8 of the relay G will close battery circuit from the battery B through wire 11, the core of the coil 8, armature K, wire 12, coil 13 of relay F, wire 14, wire 15 to battery. The operation of the relay F will close the circuit through the starting motor S as follows: battery B, wire 11, 16, contacts of the relay F, 17, coil 18 of relay C, starting motor S, wire 19, wire 15 to battery.

The energization of the coil D of the relay C will cause the latter to operate so as to connect the contacts 4 and 20 and to break the contacts 5 and 6, and also close the contacts 21 and 22. The breaking of the contacts 5 and 6 will cause the deënergization of the coil 8 of the relay G, but the armature being pivoted off center will remain in engagement with the core of the coil. The closing of the contacts 21 and 22 will close an ignition circuit from battery B through wire 23, contact 22, contact 21, wire 24, wire 24', to the spark plugs of the engine, wire 19, wire 15 to the battery. The closing of the contacts 4 and 20 will energize the coil E over the lamp circuit as far as the contact 4, and thence to the battery by way of contact 20, coil E and wire 10. The coil E is a holding coil for keeping the relay C closed.

The operation described starts the engine and the generator, and as soon as the generator voltage rises to a predetermined value, the coil 25 of the relay H is energized sufficient to attract the armature K. This breaks the circuit of the relay F, allowing the armature to retract so as to break the starting motor circuit and to deënergize the coil D. The holding coil E, however, is still being energized so that the switch C is still closed.

The generator supplies the lamps over two circuits as follows:

(*a*) From the generator A through wire 1, battery B, wire 10, coil E, contacts 20—4, wire 3 L, lamps M, L' and by wire 2 back to the generator.

(*b*) Generator A to wire 1, wire 11, wire 23, contacts 22—21, wire 24, shunt W, wire 3, L, lamps M, L' and by wire 2 back to the generator.

Now when the lamps are turned off, the generator circuit contacts 20—4 and 22—21 are broken and the contacts 5 and 6 are closed, thus restoring the apparatus to the normal condition of rest.

In order to prevent the battery B from becoming overcharged, an adjustable shunt W is connected in parallel with the battery, the one connection being outside of the contacts 21—22 to prevent its acting as a shunt circuit from the battery when the plant is not in operation.

The arrangement described allows the use of a standard 125 volt generator. It eliminates the use of a 125 volt battery, but by means of the automatic features makes power available at all times and can be controlled from any connection which is made to the main wiring circuit. The arrangement of the battery in series with the main circuit enables the battery to be charged without the use of complicated battery relays and allows a simple series motor to be used for starting purposes.

We claim:

1. In an automatically controlled electric system, a generator, an internal combustion engine having an electrical igniting circuit and being arranged to drive the generator, an electric starter, a battery, a main power or lighting circuit, connections including a relay between said main circuit and said battery, means for closing and opening the circuit of the electric starter, said means being controlled by said relay, and means disposed in the circuit of the electric starter for controlling the ignition circuit of the engine.

2. In an automatically controlled electric system, a generator, an internal combustion engine having an electrical igniting circuit and being arranged to drive the generator, an electric starter, a battery, a main power or lighting circuit, connections including a relay between said main circuit and said battery, a relay for closing and opening the circuit of the electric starter, said last named relay being controlled by said first named relay, a third relay having a coil disposed in series with the electric starter, the ignition circuit of the engine being controlled by the last named relay, and a holding coil for said last named relay actuated by a flow of current in the main circuit.

FLOYD W. PARKINSON.
CLARENCE M. KIMBALL.

Witnesses:
T. K. BOHON,
G. C. BABEL.